Patented Dec. 1, 1942

2,303,330

UNITED STATES PATENT OFFICE 2,303,330

ZINC OXIDE

Bruce R. Silver, New York, N. Y., and Ernest R. Bridgwater, Wilmington, Del., assignors to The New Jersey Zinc Company, New York, N. Y., a corporation of New Jersey, and E. I. du Pont de Nemours and Company, Wilmington, Del., a corporation of Delaware No Drawing. Application February 2, 1942, Serial No. 429,293

1 Claim. (Cl. 106—296)

This invention relates to zinc oxide, particularly to zinc oxide of use in rubber compounding, and aims to facilitate the incorporation of zinc oxide into rubber as well as to improve the behavior of the resulting compound in subsequent treatment.

This application is a continuation-in-part of our co-pending application Serial No. 344,237 filed July 6, 1940.

Zinc oxide is a known ingredient in rubber compounds and is known to impart superior properties thereto when properly incorporated. However, the zinc oxide must be dispersed adequately in the rubber and such dispersion requires thorough mixing with elaborate mechanism. Increasing the ease of dispersion of zinc oxide in rubber, increases the capacity of such equipment.

In accordance with our invention, finely-divided zinc oxide (prior to its incorporation into rubber) is treated with propionic acid and a substantial proportion of zinc propionate is formed on the particles of the zinc oxide. Thus, the finely-divided particles of zinc oxide are surface-treated with propionic acid (preferably of at least about 98% purity) under such conditions that a coating of zinc propionate is formed upon the particles.

As indicated above, the propionic acid used is preferably 98% to 99% pure and is a water-white liquid having a density of about 0.992, a boiling point of about 141° C. and a melting point of 22° C. In propionic acid of such purity, the small proportion of impurities probably comprises acetic acid or butyric acid, or both, with or without traces of esters and water.

The propionic acid should be thoroughly distributed in the mass of zinc oxide and is applied to the surfaces of the zinc oxide in proportions such that a large part of the surface area of the particles (and preferably substantially all of such area) acquires a coating of zinc propionate.

The invention is applicable in the treatment of a variety of forms of commercial zinc oxide customarily employed as a pigment or in rubber compounding. Thus, American Process zinc oxide (i. e., zinc oxide prepared direct from ore) or French Process zinc oxide (obtained by burning zinc metal), may be used.

The treatment of the zinc oxide with the propionic acid is exemplified by the following:

500 grams of zinc oxide at room temperature is placed in a rotating tube, through the end of which an atomizer is inserted. Propionic acid in the proportion of 1% on the weight of the zinc oxide is incorporated therein by spraying from the atomizer 5 grams of propionic acid diluted with 20 cc. alcohol. After the acid is added the tube is rotated for about half an hour to insure good distribution of the propionic acid over the surface of the zinc oxide particles, so that a large proportion of the surface will be coated with zinc propionate.

If desired a larger proportion of propionic acid, say, 3% on the weight of the zinc oxide, may be incorporated in the manner described above, employing 15 grams of propionic acid diluted in 30 cc. alcohol for 500 grams of zinc oxide.

A variety of equipment is available for incorporating zinc oxide into rubber, and the propionic acid-treated zinc oxide of our invention can be incorporated with any of this equipment more readily than untreated zinc oxide. Thus, when the product of our invention is incorporated in rubber on a roller mill, adequate dispersion is obtained in a much shorter time than is the case with untreated zinc oxide. Further advantages of our invention reside in the fact that, unlike untreated zinc oxide, our zinc propionate-coated zinc oxide does not adhere to a troublesome degree to the steel rolls of the mill (and thus form compressed cakes of pigment) and considerably less falls through the rolls into the pan, thus reducing the degree of re-circulation from the pan to the rolls necessary to obtain complete incorporation of the zinc oxide.

The zinc oxide product of our invention is not only incorporated more readily than untreated zinc oxide but displays superior dispersion. Thus, in a Banbury mixer, the dispersion of propionic acid-treated zinc oxide is accomplished more rapidly and at the same time more thoroughly than is the case with untreated zinc oxide. As a result, there is a saving in both time and power and an increase in the capacity of the Banbury mixers per unit of time, while the quality of the resulting rubber compound is improved, because the shorter treatment in the mixer does not break down the rubber so badly as does the longer treatment required for untreated zinc oxide.

A further advantage of the use of propionic acid-treated zinc oxide is manifested during the curing of the rubber compound into which it has been incorporated, for such zinc oxide retards the initial cure but yields the optimum cure in approximately the same time as untreated zinc oxide. Retardation of the initial cure decreases the danger of scorching the rubber.

Finally, the use of the propionic acid-treated zinc oxide is advantageous because it yields a rubber stock that is slightly stiffer than that obtained through the incorporation of an equal amount of untreated zinc oxide; the stock is not softened by the zinc propionate-coated zinc oxide as is the case with certain dispersing agents, such, for example, as stearic acid.

We claim:

Finely-divided zinc oxide, the particles of which are coated with zinc propionate.

BRUCE R. SILVER.
ERNEST R. BRIDGWATER.